(12) United States Patent
Ohgane

(10) Patent No.: US 6,411,622 B1
(45) Date of Patent: Jun. 25, 2002

(54) METHOD AND APPARATUS FOR DETECTING TIMEOUT OF ATM RECEPTION PACKET

(75) Inventor: Shoji Ohgane, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/148,785

(22) Filed: Sep. 4, 1998

(30) Foreign Application Priority Data

Sep. 8, 1997 (JP) .............................................. 9-242522

(51) Int. Cl.[7] .............................................. H04L 12/56
(52) U.S. Cl. .................................................. 370/395.1
(58) Field of Search ................................ 370/395, 389, 370/397, 503, 392, 401, 351, 352, 241, 244, 250, 251, 252, 518, 520, 428, 399, 400, 395.1, 396, 395.2, 395.3, 395.31, 395.4, 395.42, 395.51, 395.53, 395.6, 396.61, 395.62, 395.7, 395.71, 395.72, 363, 368

(56) References Cited

U.S. PATENT DOCUMENTS 5,978,951 A * 11/1999 Lawler et al. .............. 370/401

FOREIGN PATENT DOCUMENTS

EP 0 665 668 A2 8/1995
EP 0 748 088 A2 12/1996
JP 8-37530 2/1996

OTHER PUBLICATIONS

User's Manual μPD98401 Local ATM SAR Chip (NEAS-COT-S10), May 1996 pp. 116–118.

* cited by examiner

Primary Examiner—Dang Ton
(74) Attorney, Agent, or Firm—McGinn & Gibb, PLLC

(57) ABSTRACT

In an ATM reception packet timeout detecting method, a timeout of an ATM reception packet is detected by using a CAM on the reception side of an ATM communication controller. An ATM reception packet timeout detecting apparatus includes a CAM, a write/search mode switching section, a timer section, and an adder. The CAM is made up of a selector for switching input data in accordance with a write/search mode, a cell array in which a timeout detection time is registered, an address decoder for decoding the write/read address of contents of the cell array from a reception VC, and a priority encoder for outputting a coincidence signal and a coincidence address on the basis of outputs from the cell array. The timer section has a counter that is incremented in synchronism with a system clock supplied from a system bus side. The adder adds the timeout allowable time for each VC to the counter value of the timer section.

11 Claims, 6 Drawing Sheets

METHOD AND APPARATUS FOR DETECTING TIMEOUT OF ATM RECEPTION PACKET

BACKGROUND OF THE INVENTION

1. Field of the Invention

The present invention relates to a method and apparatus for detecting a timeout of a reception packet in an ATM (Asynchronous Transfer Mode) communication controller for receiving a packet formed into an ATM cell in an ATM network.

2. Description of the Prior Art

ATM (Asynchronous Transfer Mode) which is a multiplex transfer scheme for digital information in B-ISDN (broadband ISDN) allows efficient processing in accordance with the amount of information to be transferred because transfer operation need not be synchronous with the bit rate of a network. ATM is therefore widely used for high-speed, broadband communication services.

FIG. 1 shows the arrangement of an ATM network, which includes an ATM communication controller for connecting a plurality of ATM terminals 21a to 21c to a plurality of ATM servers 20a and 20b through a plurality of ATM switches 22a to 22c. Note that reference numerals 23a to 23f denote packets formed into ATM cells.

On the transmission side of each ATM communication apparatus, as shown in FIG. 2, a packet is segmented into ATM cells each consisting of a 5-byte header and a 48-byte payload. These ATM cells are then transmitted through a line. Each ATM cell incorporates a number called a VPI/VCI which is used to identify a virtual connection. With this number, communication of each cell between a transmission terminal and a reception terminal is realized.

In such an ATM network, a cell of this packet in a given connection may be delayed or discarded because of some kind of abnormality in the line or apparatus. In this case, all of the ATM cells may not arrive at the reception side. For this reason, a timeout of an ATM packet must be detected to terminate the processing for this connection.

As disclosed in, for example, "Users' Manual μPD98401 Local ATM SAR Chip (NEASCOT-S10)", on the reception side of an ATM communication controller, a conventional timeout detecting section for such an ATM reception packet is used to define the time required to reassemble ATM cells into a packet, monitor in hardware whether the monitored time has exceeded the allowable time, and notify the upper layer of a timeout upon detecting it.

FIG. 3 is a block diagram showing an example of the arrangement of the ATM communication controller.

The ATM communication controller is made up of a device PHY 28 having an ATM physical layer function, an SAR (Segmentation And Reassembly) receiving section 24 for performing reception determination on the basis of the VPI/VCI value in the header of a received ATM cell, performing conversion to a VPI/VCI identification number (to be referred to as a VC hereinafter), detecting various types of errors, and reassembling ATM cells into a packet, an SAR transmitting section 25 performs ATM cell segmentation of a transmission packet and transmission cell rate control, a control memory 27 storing various pieces of information (e.g., an address for DMA and the flag of the first cell) used in the SAR receiving section 24 and the SAR transmitting section 25, and a DMA controller 26 for performing interface control with respect to a system bus 31 to which the SAR receiving section 24, the SAR transmitting section 25, a CPU 29, and system memory 30 are connected.

Upon reception of a cell, the SAR receiving section 24 checks the VPI/VCI value in the header. The payload of the reception cell for which reception is permitted is read by the DMA controller 26 and is DMA-transferred to the system memory 30 through the system bus 31.

FIG. 4 is a block diagram showing the arrangement of a conventional ATM reception packet timeout detecting apparatus.

The ATM reception packet timeout detecting apparatus is incorporated in the SAR receiving section 24. This apparatus includes a T1 register 16 in which an allowable time for a timeout is set, a TS register 17 for storing the start time of "the VC through which reception was started earliest", an adder 10 for adding the value in the T1 register 16 to the value in the TS register 17, a timer section 6 having a counter 7 that is incremented in synchronism with a system clock 19 supplied from the system bus 31 side, and a comparator 18 for comparing the output value from the adder 10 with the counter value of the timer section 6.

The control memory 27 is divided into areas in units of VCs. Each VC information is stored in a corresponding area (to be referred to as a VC table hereinafter). The parameters associated with timeout detection in each of VC tables 15a to 15c include the E bit for enabling timeout detection and linking the corresponding VC to a link list, the reception start time of a packet, i.e., the arrival time (TS) of the first cell of the packet, and forward/backward pointers (EP/BP) for forming a link list.

The SAR receiving section 24 further includes a header/payload separating section 11 for separating the header and payload of a reception cell, a VPI/VCI-VC converter 12 for converting the VPI/VCI extracted from the header of the reception cell into a corresponding VC, and a reception data FIFO 13 for storing the payload of the reception cell until execution of DMA.

The operation of the conventional timeout detecting apparatus shown in FIG. 4 will be described next.

A timeout of a reception packet is detected by a scheme of forming a link list using forward/backward pointers (FP/BP) in the corresponding VC table. In these pointers, the number of a VC through which reception was started earlier and the number of a VC through which reception was started later are respectively stored.

When a cell is received, the E bit is read out from the VC table corresponding to the reception VC. If the E bit is set and the cell is the head of a new packet, the reception VC is written in the TS area of the VC table corresponding to this VC while the counter value of the timer section 6 at this time point is regarded as the current time. If, for example, this link list has no VC, the reception VC is written in the TS register 17 at this time. After the pointers in the VC table are updated, this VC is added to the end of the link list. That is, "the VC through which reception was started earliest" is always the head of a link list, whereas "the VC through which reception was started latest" is linked to the end of the link list.

If the last cell of the packet arrives within the allowable time for a timeout which is set in the T1 register 16, the pointers of the corresponding VC and preceding and succeeding VCs are updated, and this VC is removed from the link list. If, for example, "the VC through which reception was started earliest" is deleted from the link list, the TS register 17 is rewritten with the reception start time of the next VC to be linked.

A timeout is therefore detected first from the VC at the head of the link list, i.e., "the VC through which reception was started earliest". For this reason, the value obtained from the adder 10 by adding the reception start time of this VC, written in the TS register 17, to the allowable time for a timeout set in the T1 register 16, is input to an input terminal A of the comparator 18, while the counter value of the timer section 6 indicating the current time is input to an input terminal B of the comparator 18. A timeout can be detected by comparing the two values. If the inputs to the inputs terminals A and B of the comparator 18 are equal to each other, a timeout is detected from "the VC through which reception was started earliest".

In the conventional detecting apparatus described above, however, timeout detection cannot be performed in accordance with the cell rate or packet length in each VC. Assume that in the arrangement shown in FIG. 4, the periods of time required for reassembly after proper reception of packets through the respective VCs are respectively 2 msec for VCi; 4 msec for VCj; and 8 msec for VCk. In this case, the allowable time for a timeout must be set to 8 msec. Even if, therefore, it takes 5 msec to receive a packet through VCi, no timeout is detected. In addition, even if a cell is actually discarded from VCi, and reception is not complete, no timeout can be detected before a lapse of 8 msec. That is, accurate timeout detection cannot be performed in units of VCs.

This is because only one value can be set as a timeout allowable time for a reception packet with respect to a plurality of VCs.

SUMMARY OF THE INVENTION

The present invention has been made in consideration of the above problems in the prior art, and has as its object to provide a timeout detecting method and apparatus which can accurately perform timeout detection in units of reception VCs during the packet reassembly time, i.e., the time interval between reception of a first cell and reception of a last cell, in accordance with the cell rate of each reception VC and the packet length in an ATM communication controller.

In order to achieve the above object, according to the first basic aspect of the present invention, there is provided an ATM reception packet timeout detecting method comprising detecting a timeout of an ATM reception packet by using a CAM (Contents Addressable Memory).

In order to achieve the above object, according to the second basic aspect of the present invention, there is provided an ATM reception packet timeout detecting apparatus comprising (a) a CAM made up of a selector for switching input data in accordance with a write/search mode, a cell array in which a timeout detection time is registered, an address decoder for decoding a write/read address of contents of the cell array from a reception VC, and a priority encoder for outputting a coincidence signal and a coincidence address on the basis of outputs from the cell array, (b) a write/search mode switching section, (c) a timer section having a counter that is incremented in synchronism with a system clock supplied from a system bus side, and (d) an adder for adding the timeout allowable time for each VC to a counter value of the timer section.

According to the present invention, a bit for enabling timeout detection in each reception VC and the timeout allowable time for a reception packet can be set, in units of VCs, in each area in which corresponding VC information is stored.

As is obvious from the respective aspects, the first effect of the present invention is that timeout detection for an ATM packet can be accurately performed in units of VCs in accordance with the cell rate of each reception VC and the packet length. This is because the timeout allowable time for an ATM reception packet can be set in units of reception VCs. If, for example, the periods of time required for reassembly after proper reception of packets through the respective VCs are respectively 2 msec for VCi; 4 msec for VCj; and 8 msec for VCk, the timeout allowable times for the respective VCs can be set to 2 ms, 4 ms, and 8 ms, respectively.

The second effect of the present invention is that since the CAM is used for the timeout detecting section, the circuit size of the timeout detecting section can be made small.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF PREFERRED EMBODIMENTS

A few preferred embodiments of the present invention will be described below with reference to the accompanying drawings.

Figure 5:
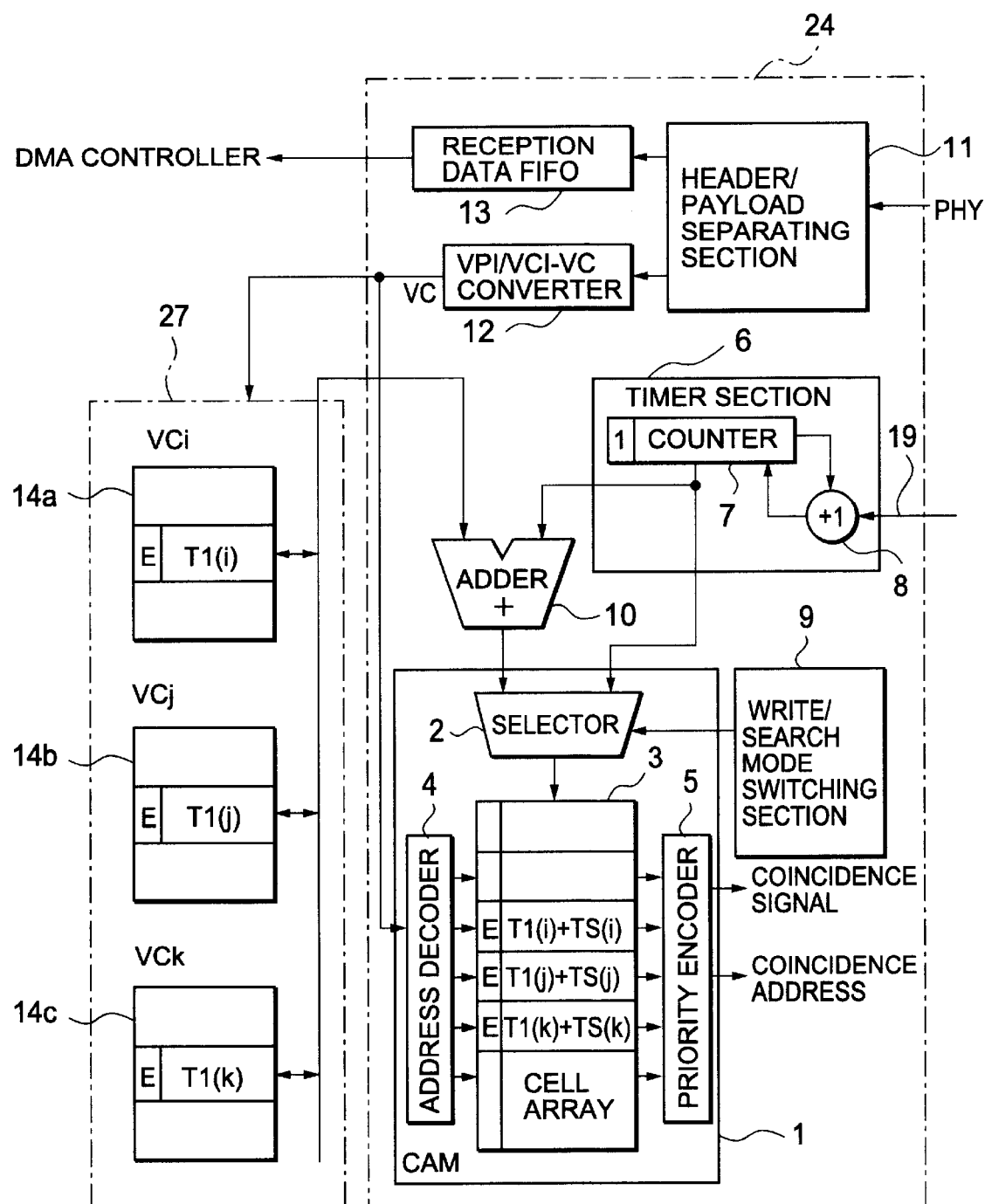
FIG. 5 is a block diagram showing the arrangement of a timeout detecting apparatus according to the first embodiment of the present invention.

FIG. 5 is a block diagram showing a timeout detecting apparatus according to the first embodiment of the present invention.

Figure 1:
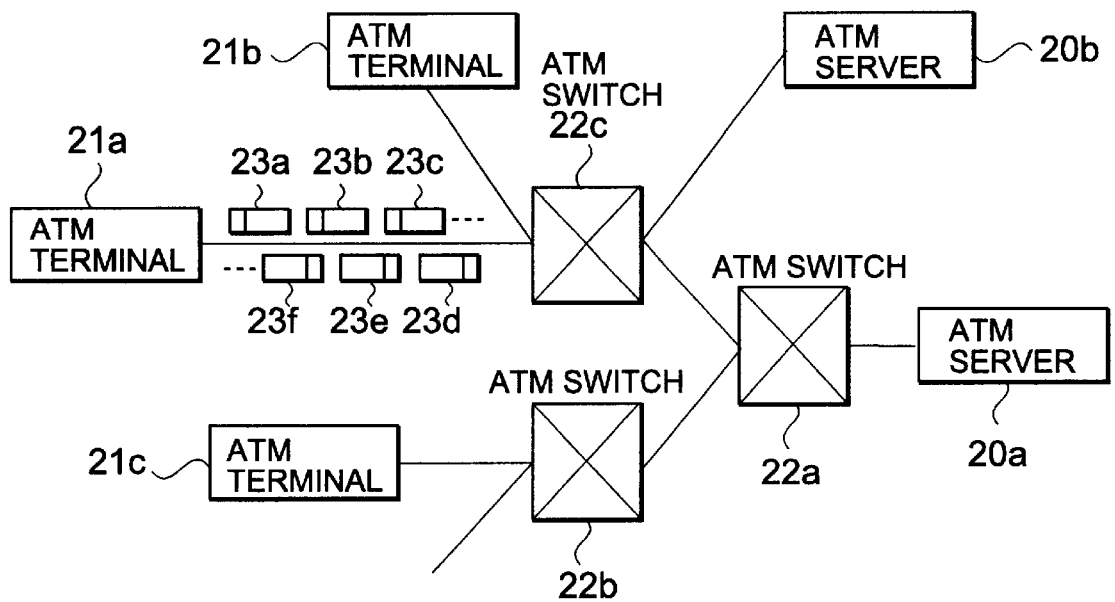
FIG. 1 is a block diagram for explaining an ATM network system formed by ATM communication apparatuses to which the present invention and the prior art are applied.
Figure 2:
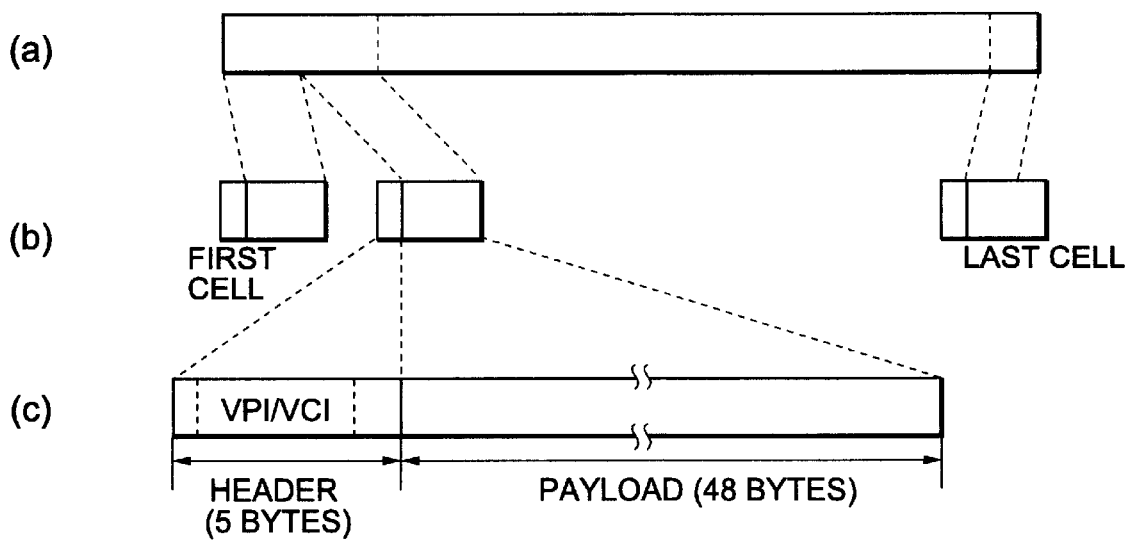
FIGS. 2A to 2C are block diagrams for explaining how a packet is segmented into ATM cells.
Figure 3:
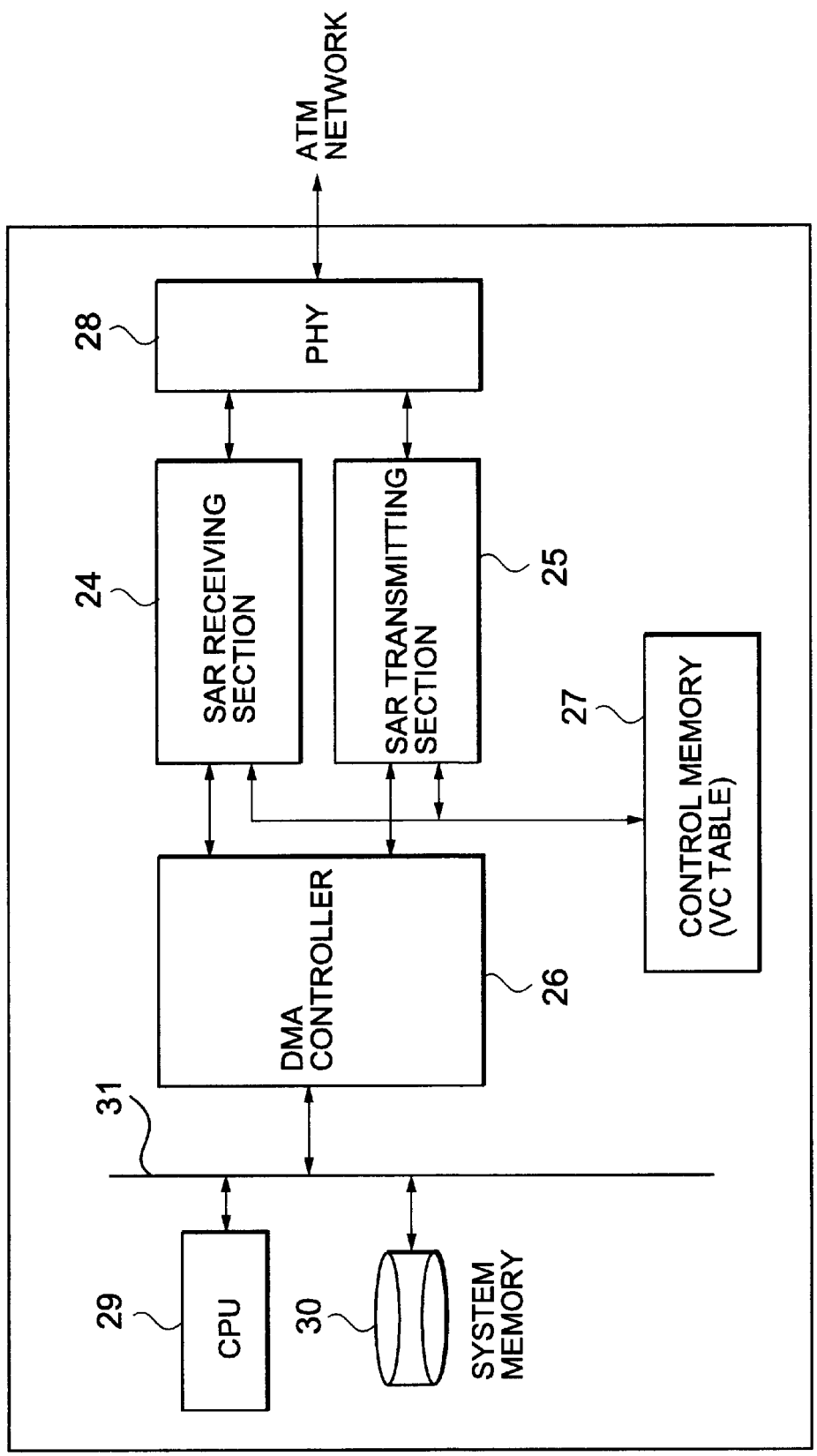
FIG. 3 is a block diagram showing an example of the arrangement of an ATM communication apparatus to which the present invention and the prior art are applied.
Figure 4:
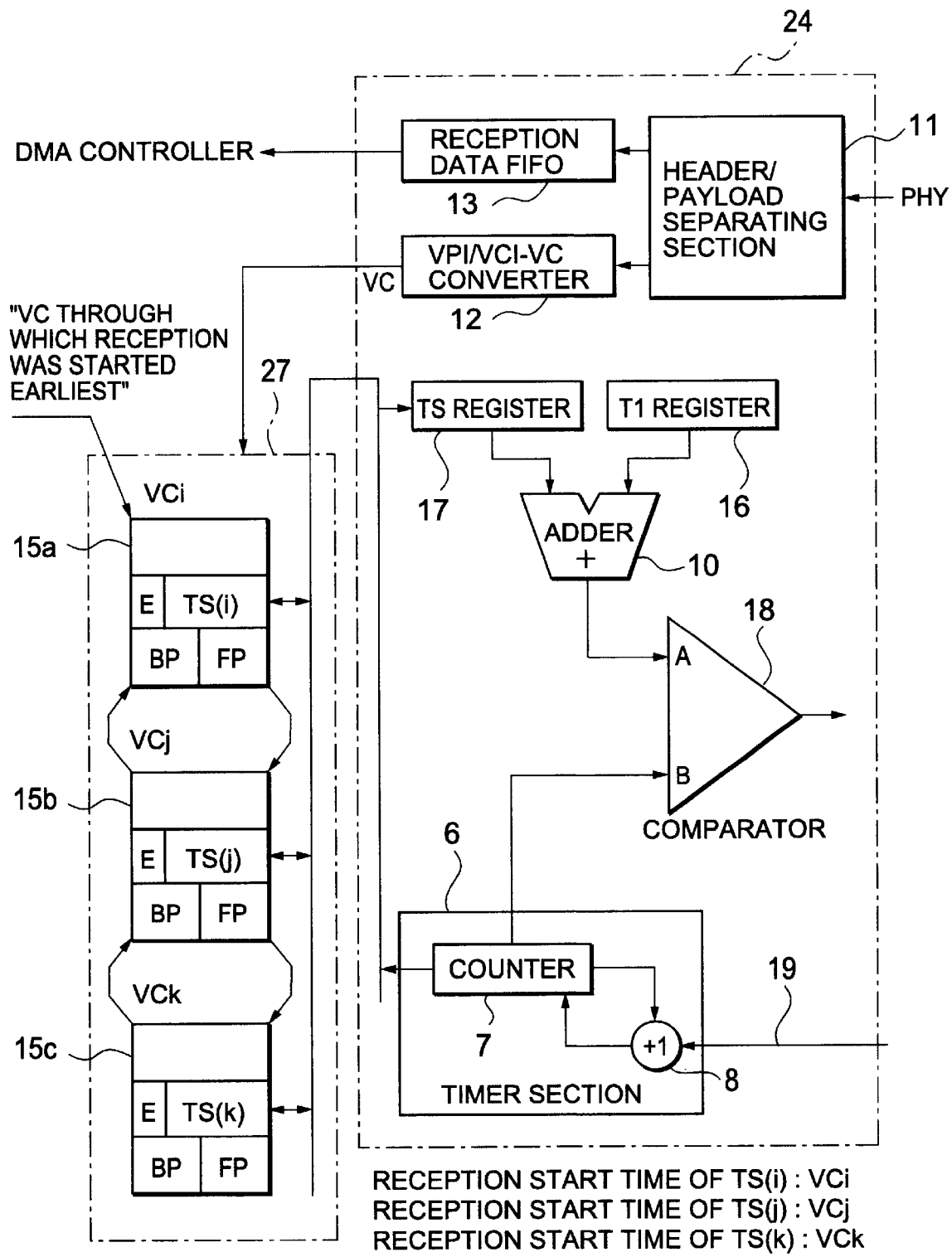
FIG. 4 is a block diagram showing an example of the arrangement of a conventional timeout detecting apparatus.

The ATM reception packet timeout detecting apparatus shown in FIG. 5 is incorporated in the SAR receiving section 24 of the ATM communication controller in FIG. 3. This apparatus is made up of a CAM 1 constituted by a selector 2 for switching input data in accordance with the write/search mode, a cell array 3 in which timeout detection times are registered, an address decoder 4 for decoding a write/read address for the contents of the cell array 3 from a reception VC, and a priority encoder 5 for outputting a coincidence signal and a coincidence address on the basis of the outputs from the cell array 3, a write/search mode switching section 9, a timer section 6 having a counter 7 that is incremented in synchronism with a system clock 19 supplied from the system bus 31 side, and an adder 10 for adding the timeout allowable time for each VC to the counter value of the timer section 6.

A control memory 27 is divided into areas in units of VCs to store VC information in each area. The parameters associated with timeout detection in each of VC tables 14a to 14c include the E bit for enabling timeout detection and a timeout allowable time (T1) for a reception packet.

The SAR receiving section 24 further includes a header/payload separating section 11 for separating the header and payload of a reception cell, a VPI/VCI-VC converter 12 for converting the VPI/VCI extracted from the header of the reception cell into a corresponding VC, and a reception data FIFO 13 for storing the payload of the reception cell until DMA operation.

The operation of this embodiment will be described next.

In the present invention, a timeout of a reception packet is detected by using the CAM. The CAM is a contents addressable memory. When data stored in the cell array coincides with data input as a search pattern, this memory outputs the address at which the data is stored, together with a coincidence signal.

Figure 6:
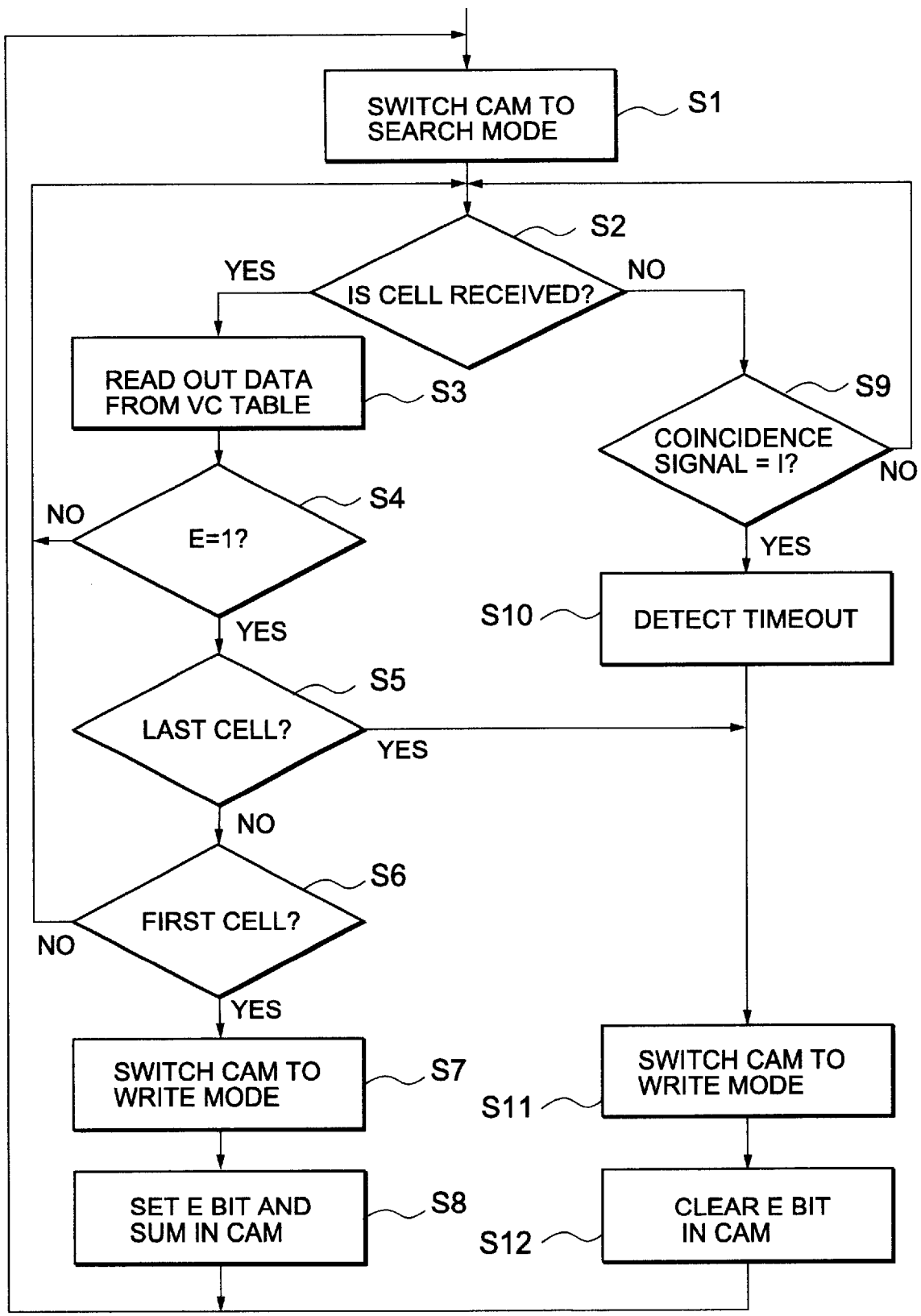
FIG. 6 is a flow chart for explaining the operation of the first embodiment of the present invention in FIG. 1.

FIG. 6 is a flow chart for explaining the operation of the first embodiment.

When the SAR receiving section 24 receives a cell, the E bit and the timeout allowable time are read out from the VC table stored in the control memory 27 and corresponding to the reception VC (steps S2 and S3). If it is determined upon checking of the E bit that the E bit is not set (step S4), the flow waits for reception of a cell. If the E bit is set, it is checked whether the reception cell is the last cell of the packet (step S5). If the reception cell is the last cell, i.e., the last cell of the packet has arrived within the timeout allowable time, the CAM 1 is switched to the write mode (step S11). The E bit in the cell array 3 is then cleared, and timeout detection in this VC is then terminated (step S12). If the reception cell is not the last cell, it is checked whether the cell is the first cell (step S6). If the cell is not the first cell, the flow waits for reception of a cell again. If the cell is the first cell, the CAM 1 is switched to the write mode (step S7). Then, the timeout detection time, i.e., the value obtained by adding the reception time (TS) of the first cell to the timeout allowable time (T1) and the E bit are registered in the cell array 3 of the CAM 1 (step S8). The CAM 1 is then switched to the search mode (step S1).

In the search mode of the CAM 1, the value obtained by adding "1" to the most significant bit of the counter value of the timer section 6 indicating the current time is input as a search pattern. This value used to prevent detection of a coincidence after the E bit in the cell array 3 is cleared. If the input search pattern coincides with the timeout time registered in the cell array 3, it means that a timeout is detected in the VC corresponding to the coincident address (steps S9 and S10). If a timeout is detected, the CAM 1 is switched to the write mode (step S11). The E bit in the cell array 3 is then cleared, and timeout detection in this VC is complete (step S12).

In the first embodiment of the present invention, since the timeout allowable times (T1) for reception packet from the respective VCs can be set in the VC tables 14a to 14c in the control memory 27, timeout detection can be accurately performed in units of VCs in accordance with the cell rate and packet length in each VC. In addition, since the CAM can be used, integration is facilitated to allow a reduction in the circuit size of the timeout detecting circuit.

Figure 7:
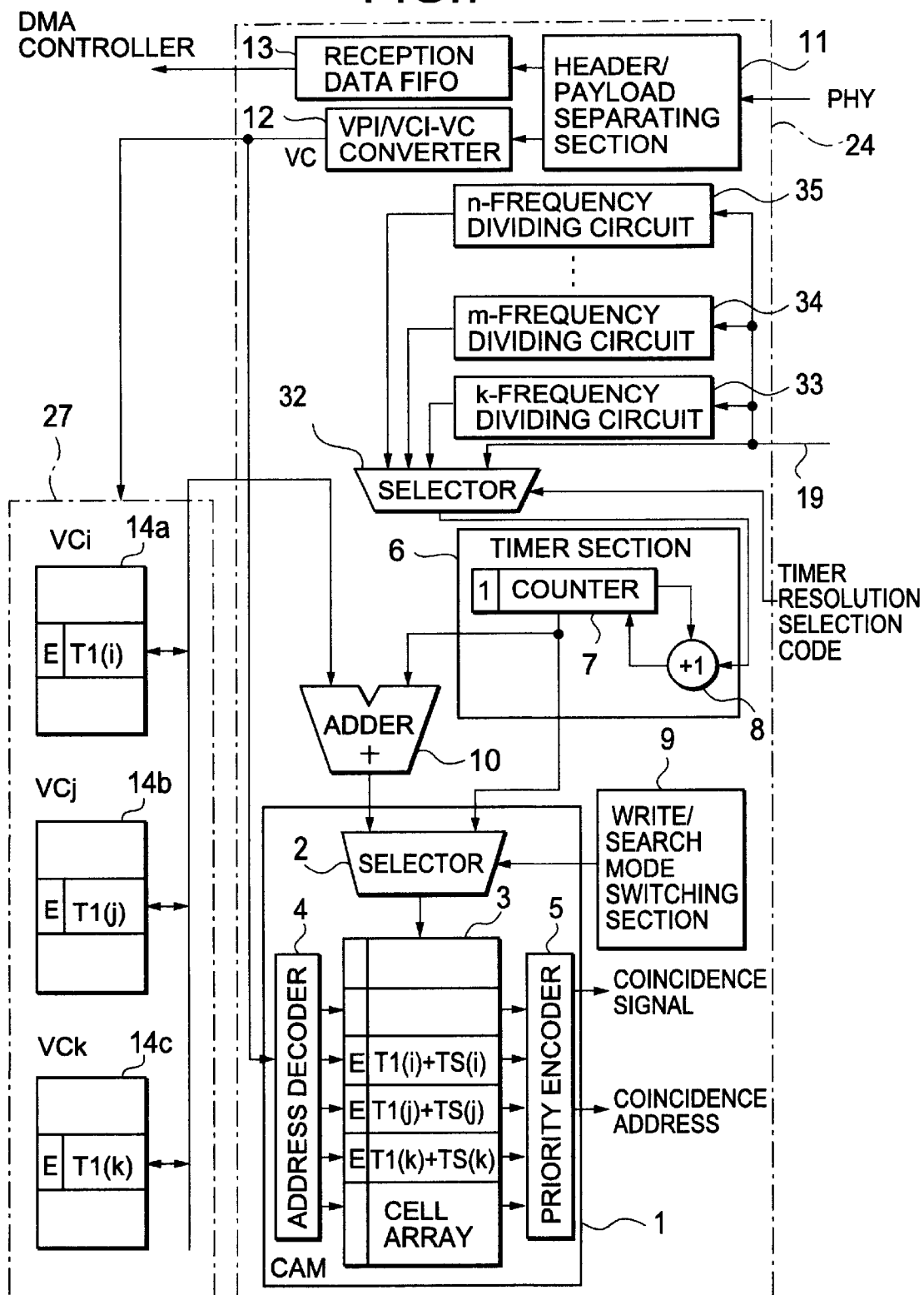
FIG. 7 is a block diagram showing the arrangement of a timeout detecting apparatus according to the second embodiment of the present invention.

FIG. 7 is a block diagram showing a timeout detecting apparatus according to the second embodiment of the present invention.

Referring to FIG. 7, this embodiment includes a selector 32 for selecting one of a system clock 19 supplied from the system bus 31 side and outputs from a k-frequency dividing circuit 33, an m-frequency dividing circuit 34, and an n-frequency dividing circuit 35 (k, m, and n are positive integers) in accordance with an externally supplied timer resolution selection code. The counter value of the timer section 6 is incremented in synchronism with the output signal from the selector 32. The remaining part of the arrangement of the second embodiment is the same as that of the first embodiment shown in FIG. 5.

It takes time to completely receive a packet at a low rate or a long packet. For this reason, the bit width of areas such as a counter 7 in a timer section 6, a cell array 3 of a CAM 1, and the timeout allowable time area in each VC table must be increased. If, for example, the bit width of these areas is 16 bits, and the system clock 19 has a frequency of 33 MHz, one unit time is 30 ns, and the maximum time that allows timeout detection is about 2 ms. That is, timeout detection cannot be performed for a packet that requires 10 ms until completion of reception. To perform timeout detection, therefore, the bit width of each area must be increased by 3 bits.

In the second embodiment, since the counter value of the timer section 6 can be incremented by a signal obtained by frequency-dividing the system clock 19 using each frequency dividing circuit and a timer resolution selection code, one unit time can be prolonged. This eliminates the need for increasing the bit width of each area with respect to a packet received at a low rate or a long packet. When a packet that requires 10 ms until completion of reception is to be received, timeout detection can be performed by selecting a signal obtained by frequency-dividing the system clock 19 by 6.

In addition to the effect of the first embodiment, the second embodiment can cope with a packet received at a low rate or a long packet because the incrementing unit time of the timer section can be prolonged by frequency-dividing the system clock. Furthermore, the second embodiment can decrease the bit width of areas such as the counter in the timer section, the cell array of the CAM, and the timeout allowable time area in each VC table.

What is claimed is:

1. An ATM reception packet timeout detecting method, comprising:

receiving a reception VC;

reading a timeout allowable time from a VC table corresponding to the reception VC, wherein the timeout allowable time is a variable according to each VC; and adding a reception time of a first cell of the ATM packet to the timeout allowable time.

2. The method according to claim 1, wherein a bit for enabling timeout detection in each reception VC and the timeout allowable time for the ATM reception packet can be set, in units of VCs, in an area in which information of each reception VC is stored.

3. An ATM reception packet timeout detecting apparatus comprising:

(a) a CAM made up of a selector for switching input data in accordance with a write/search mode, a cell array in which a timeout detection time is registered, an address decoder for decoding a write/read address of contents of said cell array from a reception VC, and a priority encoder for outputting a coincidence signal and a coincidence address on the basis of outputs from said cell array;

(b) a write/search mode switching section;

(c) a timer section having a counter that is incremented in synchronism with a system clock supplied from a system bus side; and (d) an adding section for adding the timeout allowable time for each VC to a counter value of said timer section.

4. The ATM reception packet timeout detecting apparatus, according to claim 3, wherein said apparatus further comprises:
   at least one frequency dividing circuit that divides the system clock;
   a selector that selects a signal for incrementing the counter value of said timer section in accordance with an externally supplied time resolution selection code, which controls a unit time of said timer section.

5. The ATM reception packet timeout detecting apparatus, according to claim 4, wherein said apparatus communicates with a control memory comprising a plurality of VC tables in which bits for enabling timeout detection in reception VC's and timeout allowable times for ATM reception packets are stored in units of VCs.

6. An ATM (Asynchronous Transfer Mode) reception packet timeout detecting method, comprising:
   switching a CAM (Contents Addressable Memory) of a SAR (Segmentation And Reassembly)section to a search mode;
   receiving a reception VC (Virtual Connection);
   reading a timeout allowable time from a VC table corresponding to the reception VC, wherein the timeout allowable time is a variable according to each VC that depends on at least one of cell rate and packet length of each ATM reception packet;
   determining whether the reception VC is a first cell of the ATM reception packet; and
   switching the CAM to a write mode and adding a reception time of the first cell to the timeout allowable time, if the reception VC is the first cell.

7. The method according to claim 1, wherein a bit for enabling timeout detection in each reception VC and the timeout allowable time for the ATM reception packet can be set, in units of VCs, in an area in which information of each reception VC is stored.

8. The ATM reception packet timeout detecting method according to claim 6, further comprising:
   frequency-dividing a system clock;
   selecting a signal for incrementing a counter value of a timer section in accordance with an externally supplied time resolution code; and
   controlling the units of time of said timer section.

9. An ATM reception packet timeout detecting apparatus, comprising:
   a cell array organized by VC units in which a timeout detection time is registered;
   an address decoder that decodes a write/read address of contents of said cell array;
   a timer section having a counter that is incremented according to a system clock; and
   an adding section that adds a variable timeout allowable time for each VC to a counter value of said timer section.

10. The ATM reception packet timeout detection apparatus according to claim 9, comprising:
    a CAM including a selector for switching input data in accordance with a write/search mode;
    a priority encoder for outputting a coincidence signal and a coincidence address on the basis of outputs from said cell array; and
    a write/search mode switching section.

11. The ATM reception packet timeout detecting apparatus, according to claim 10, wherein said apparatus further comprises:
    at least one frequency dividing circuit that divides the system clock; and
    a selector that selects a signal for incrementing the counter value of said timer section in accordance with an externally supplied time resolution selection code, which controls a unit time of said timer section.

\* \* \* \* \*